United States Patent [19]

Donofrio et al.

[11] 3,789,243

[45] Jan. 29, 1974

[54] MONOLITHIC MEMORY SENSE AMPLIFIER/BIT DRIVER HAVING ACTIVE BIT/SENSE LINE PULL-UP

[75] Inventors: Nicholas M. Donofrio; Douglas W. Kemerer, both of Essex Junction, Vt.

[73] Assignee: International Business Machines Corporation, Armonk, N.Y.

[22] Filed: July 5, 1972

[21] Appl. No.: 268,988

[52] U.S. Cl. .................................. 307/238, 307/237

[51] Int. Cl. ............................................ H03k 5/08

[58] Field of Search ..................... 307/235, 238, 237

[56] References Cited

UNITED STATES PATENTS

| | | | |
|---|---|---|---|
| 3,638,039 | 1/1972 | Chen et al. | 307/238 |
| 3,688,264 | 8/1972 | Dingwall | 307/238 X |

*Primary Examiner*—John Zazworsky

*Attorney, Agent, or Firm*—Theodore E. Galanthay

[57] ABSTRACT

The specification describes a sense amplifier/bit driver circuit having an active bit/sense line pull-up circuit. The active pull-up circuit is shown substantially as two transistors connected between the bit driver circuit and the bit/sense lines. A normal write operation is performed by pulling one bit/sense line to a down level (ground) potential and retaining the other bit/-sense line at an up level (positive) voltage. Immediately after the write operation, recovery time is required to bring the down level bit/sense line back to the up level for subsequent read/write operations. The pull-up circuit described in the specification is turned on to perform this function and maintained off in order not to interfere with other operations.

5 Claims, 1 Drawing Figure

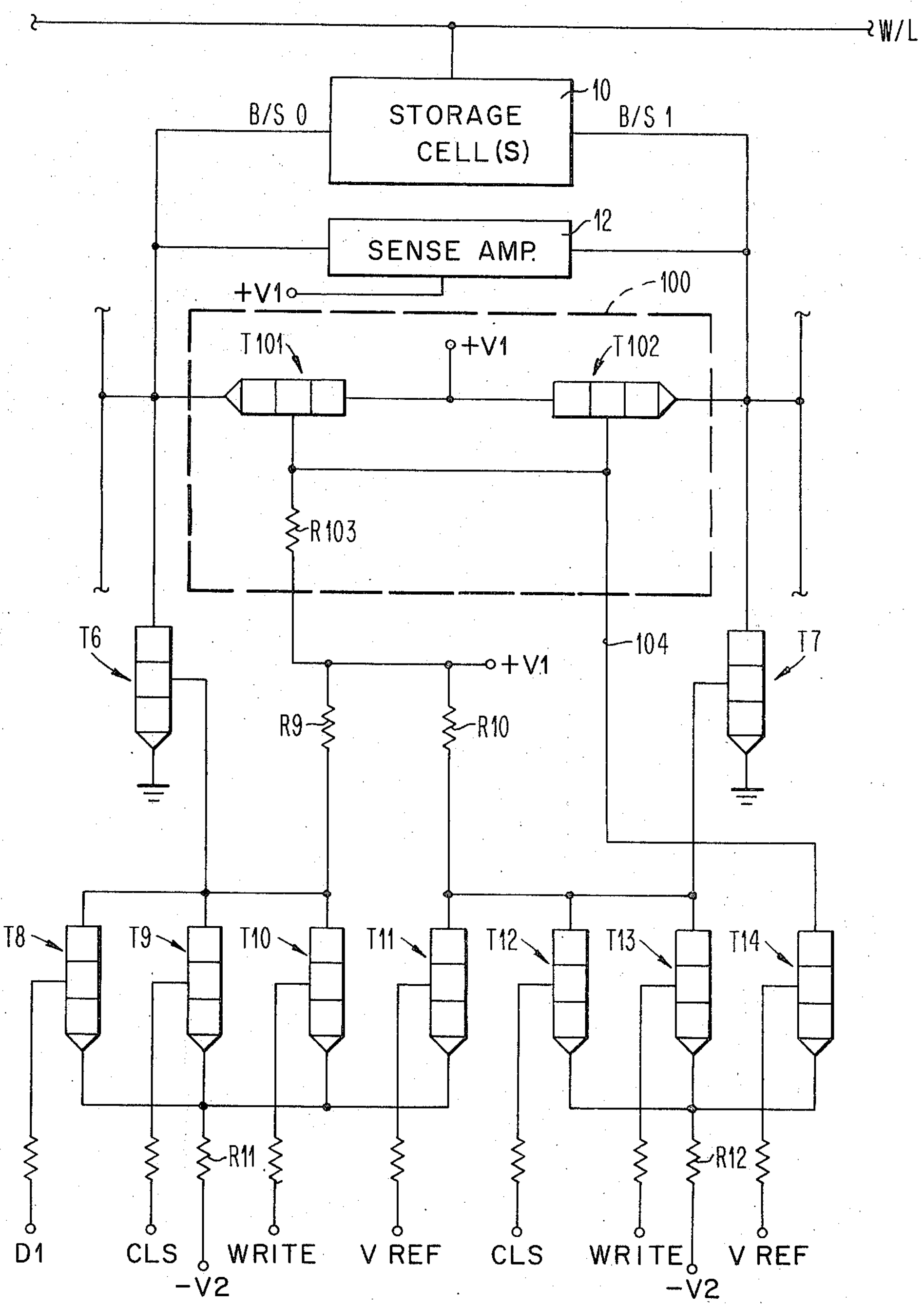
W/L
STORAGE CELL(S)
10
B/S 0
B/S 1
SENSE AMP.
12
+V1
100
T101
T102
R103
T6
T7
104
R9
R10
T8
T9
T10
T11
T12
T13
T14
R11
R12
D1
CLS
WRITE
V REF
-V2

MONOLITHIC MEMORY SENSE AMPLIFIER/BIT DRIVER HAVING ACTIVE BIT/SENSE LINE PULL-UP

CROSS-REFERENCE TO RELATED APPLICATIONS AND PATENTS

U.S. Pat. No. 3,676,704, issued on July 11, 1972, invented by Nicholas M. Donofrio et al., and commonly assigned with the present application.

BACKGROUND OF THE INVENTION

This invention relates to an active pull-up circuit and more particularly to a circuit for pulling up the down level bit/sense line following a write operation in a monolithic memory.

It is well known to construct monolithic memories having storage cells comprising field effect transistors (FET's). It is also known to address and sense such FET storage cells with bipolar circuits through appropriate interface circuits. An example of such an arrangement is found in the referenced U.S. Pat. No. 3,676,704.

As the size of monolithic memories comprising FET storage cells are increased, the respective size of the capacitance on the bit/sense lines is increased. In presently known bit driver/sense amplifier circuits, the "recovery" of a particular bit/sense line relies upon the RC time constant through the impedance of the sense amplifier. The write recovery time therefore increases significantly as the size of the memory is increased. This restriction unduly increases the cycle time of the memory.

SUMMARY OF THE INVENTION

It is therefore a primary object of this invention to reduce the cycle time in monolithic memories.

It is another object of this invention to actively pull up down level bit/sense lines in a memory.

Lastly, it is an object of this invention to provide an active pull-up circuit with a minimum number of components, integrated with known bit driver/sense amplifier circuits.

In accordance with the present invention, a pull-up circuit including two transistors and impedance means are connected substantially between the bit driver circuit and the bit/sense lines of a monolithic memory. This pull-up circuit is maintained off during actual read or write. However, during write recovery (immediately after a write operation), the transistor connected to the down level bit/sense line is turned on, establishing a direct charge path to the "capacitive load" on the bit/-sense line.

The foregoing and other objects, features and advantages of this invention will be apparent from the following more particular description of preferred embodiments of the invention, as illustrated in the accompanying drawing.

DESCRIPTION OF THE DRAWINGS

The single drawing FIGURE is a schematic curcuit diagram of the present invention in the environment of a previously disclosed monolithic memory sense amplifier/bit driver.

DESCRIPTION OF THE PREFERRED EMBODIMENT

Refer now to the description of the preferred embodiment. In accordance with the present invention, pull-up circuit 100 is connected between a previously known bit driver circuit and the bit/sense line leading to the interface circuits of storage cell 10, for example. The pull-up circuit 100 comprises transistors T101 and T102 having a common collector connection to potential +V1. T101 and T102 also have a common base connection connected to potential +V1 through impedance means represented by resistor R103. The common base connection is also connected to the collector of transistor T14. The emitter of T101 is connected to the bit/sense 0 line labelled B/S 0 while the emitter of T102 is connected to the bit/sense 1 line designated B/S 1. The remainder of the circuit of FIG. 1 was previously described in the cross referenced U.S. Pat. No. 3,676,704, which is hereby incorporated by reference.

At this point it appears helpful to briefly discuss the operation of the circuit of FIG. 1 other than pull up circuit 100 in order to appreciate the environment in which the present invention operates. Data is written into and read out of the storage cell 10 by controlling and detecting the potentials and current on the word line W/L and the bit lines B/SO and B/S1. The present invention does not relate to the controlling of potential on the word line W/L or of the configuration of the storage cell 10 including the interfacing circuits, and therefore no further detailed description is given herein.

The sense amplifier 12 is shown in block form since the internal details thereof are not germain to the present invention. Suffice it to say that sense amp 12 does not include pull up circuits of any type. Therefore, in order for either of the bit/sense lines to charge to an up level through sense amp 12, the impedance of the sense amp must be considered in combination with the capacitive load of the storage cell 10. It should be noted that storage cell 10 is not necessarily a single cell but rather an entire row of cells is connected to each of the bit sense lines 0 and 1. Therefore, to bring either of these bit sense lines from a down level to an up level, the impedance path from the potential +V1 through the impedance of sense amplifier 12 to the capacitive load provided by storage cells 10 results in a rise time determined by the RC time constant.

When data is not being read into or read out of the storage cell 10, the potentials on the B/SO and B/S1 lines are substantially equal. Also, during the read cycle, the potentials are substantially equal, sensing being performed by detecting a current or very small voltage difference. Writing, however, is accomplished by varying the potentials of the B/SO and B/S1 lines by controlling the conductance of transistors T6 and T7. The conduction of T6 or T7 is determined by the operation of the bit driver circuitry represented by transistors T8 through T14. The bit driver circuitry essentially consists of a first current switch including transistors T8–T10, a second current switch including transistors T12–T14 cross coupled by transistor T11.

During the quiescent state of the cell and during reading data from the cell, transistors T6 and T7 are maintained nonconductive by the conduction of one of transistors T8–T10 and one of transistors T12–T13 in each of the current switch circuits 14 and 16. This back-biases the base-to-emitter junctions of transistors T6 and T7 so that transistors T6 and T7 are maintained off and therefore nonconducting.

Assume now that a binary "0" is to be written into the cell. Then a D1 pulse which is a down level pulse indicating that a binary "0" is to be stored, and a CLS pulse which is a down level clocking pulse, are first applied to transistors T8, T9 and T12 turning those transistors off and leaving transistors T10 and T13 on. At some time thereafter a write pulse is applied to transistors T10 and T13 turning transistors T10 and T13 off. When transistor T10 turns off the current supplied from the current source consisting of resistor R11 and the voltage source −V2 flows through transistor T11 so that transistor T11 conducts while transistors T8, T9, T10, T12 and T13 are biased off. Thus the base of transistor T6 is allowed to rise to some potential determined by the potential of the source +V1 and resistance of the resistor R9 which allows transistor T6 to conduct. At the same time transistor T7 is held off by the conductance of transistor T11. This satisfies the requirement for writing a "0" into the storage cell.

To write a binary "1" into the storage cell the same process occurs except that no D1 down level pulse that is, an up level pulse, is supplied to the base of transistor T8. A CLS pulse is first applied to the base of transistors T9 and T12 causing them to turn off. Thereafter a down level write pulse is applied to the base of transistors T10 and T13. This leaves transistors T8 and T14 conducting while transistors T9, T10, T11, T12 and T13 are biased nonconductive. Since transistor T8 is conducting it means that transistor T6 will be biased nonconducting because the potential at the base of transistor T6 is sufficiently low to maintain transistor T6 off. At the same time transistor T7 is allowed to conduct because all the transistors T11, T12 and T13 coupled to its base are off and allow a potential determined by the voltage source V1 and the resistance of resistor R10 to bias the transistor T7 conductive. This satisfies the requirements of writing a "1" into the storage cell. Of course, those skilled in the art will recognize that the designations of binary "0" and "1," as they relate to up and down level signals, are completely arbitrary nomenclature.

Note that the input terminals CLS, WRITE, $V_{REF}$, and −V2, are in fact common terminals. Note that both transistor T101 and transistor T102 in pull-up circuit 100 are off whenever conductor 104 is held at a down level. It is further clear that when T101 and T102 are off, the pull up circuit has no effect on the remainder of the circuit. Furthermore, conductor 104 will always be at a down level when T14 is on. As soon as either the CLS or WRITE inputs return to an up level, T12 and/or T13, respectively, are caused to conduct turning T14 off. In accordance with the present invention, this turns one of transistors T101 or T102 on. Depending on whether line B/SO or B/S1 were brought to a down level in the previous write operation, a suitable base to emitter voltage differential will cause that particular one of transistors T101 or T102 to conduct and recover the appropriate bit sense line by charging it directly from potential +V1. Exemplary potential and component values are as follows:

−V2 = minus 3 volts $V_{REF}$ = 0 volts, V1 = positive 3 volts

R9 = R10 = approximately 2K

R103 = approximately 2K

The resistors in the various base circuits are approximately equal to 100 ohms. These resistors are base stabilizing resistors providing a greater degree of stability and noise immunity in the current switch emitter following circuits used.

Thus it is seen that the active pull up circuit 100 is activated immediately after the conclusion of the write cycle to return the down level bit line to its up level. It has also been shown how during the write cycle, the active pull up circuit is completely off and does not effect the remainder of the circuit. It should be noted that the active pull up circuit is also off during a read operation. During a read operation, transistors T10 and T13 receive up level pulses. This turns T10 and T13 on causing both T6 and T7 to be held off. This maintains the potential of the bit sense lines at an up level. Therefore, even though T14 is off permitting the bases of T101 and T102 to be at an up level, they cannot conduct because the potential at their emitters is larger than or equal to +V1 minus $V_{be}$ of each of these transistors.

Therefore either during a read or write operation, the active pull up circuitry is maintained in an off state so as not to affect the remainder of the circuit. However, immediately following a write cycle, during write recovery time, one of the transistors T101 or T102 is brought to conduction causing the corresponding highly capacitive bit/sense line to be brought to an up level through the direct charge path established through the transistor from potential source +V1.

An added feature of the active pull up circuit is that transistors T101 and T102 cannot go into saturation. Since T14 must be off in order for either of T101 or T102 to conduct, during such a time there is substantially no base current so that each of the two transistors in the active pull up circuit is therefore connected substantially as a diode, precluding saturation.

While the invention has been shown and descirbed with reference to a preferred embodiment thereof it will be understood by those skilled in the art that various changes in form and details may be made therein without departing from the spirit and scope of the invention.

What is claimed is:

1. In a monolithic memory array having a plurality of storage cells electrically connected to a bit driving circuit, and having sensing means also electrically connected to said storage cell, said bit driving means inserting binary information into said storage cell by establishing a potential difference between a pair of bit/-sense lines, the improvement comprising:

a source of potential;

an impedance;

first and second transistors each having collector, base, and emitter, the collectors being electrically connected to said source of potential, the bases being electrically connected also to said source of potential through said impedance, each of the emitters being respectively connected to one of said pair of bit/sense lines.

2. Apparatus as in claim 1 in which said bases are electrically connected to said bit driving circuit biasing said transistors off during read or write operations such that the bases being electrically connected to said source of potential through said impedance and said collectors being electrically connected to said source of potential, essentially comprise diode connections between said source of potential and each of said bit lines for establishing a conductive current path between said source of potential and the one of the bit lines having a relatively lower potential.

3. A bit driver circuit for controlling the potential on two bit lines having a separate transistor coupling each of the bit lines to a reference potential when it is conducting; a first current switch circuit having transistors with their collectors coupled to the base of the first of the separate transistors and their emitters coupled to a first current source to bias the first of the separate transistors nonconducting when any one of the mentioned transistors in this first current switch are conducting; a second current switch circuit having transistors with their collectors coupled to the base of the second of the separate transistors and their emitters coupled to a second common current source to bias the second of the separate transistors nonconducting when any of the mentioned transistors in the second current switch circuit are conducting; a cross-coupling transistor with its emitter coupled to the first current source and its collector coupled to the base of the second of the separate transistors so that this crosscoupling transistor conducts while the mentioned transistors in the first current switch are all biased nonconducting to bias the second of the separate transistors off; and means for biasing the separate transistors on while they are not held off by the current switch circuits whereby a data signal need be supplied only to the first of the current switches, the improvement comprising:

active pull up means coupling a potential source to one of the said two bit lines, during a write recovery cycle immediately following a write cycle.

4. A bit driver circuit as in claim 3 wherein the active pull up means coupling a potential source to one of the said two bit lines, during a write recovery cycle immediately following a write cycle comprises:

an impedance;

first and second transistors each having a collector, base, and emitter, the collectors being electrically connected to said source of potential through said impedance, each of the emitters being respectively connected to one of said pair of bit/sense lines.

5. A bit driver circuit as in claim 4 wherein each of said bases is electrically connected to said bit driving circuit biasing said transistors off during read or write operations such that the bases being electrically connected to said source of potential through said impedance and said collectors being also electrically connected through said source of potential, essentially comprise diode connections between said source of potential and each said bit lines for establishing a conductive current path between said source of potential and the one of the said bit lines having a relatively lower potential.

* * * * *